Dec. 29, 1959     G. HOOKHAM     2,918,942
GOGGLE VALVE

Filed Dec. 20, 1954     2 Sheets-Sheet 1

Dec. 29, 1959    G. HOOKHAM    2,918,942
GOGGLE VALVE
Filed Dec. 20, 1954    2 Sheets-Sheet 2

Inventor
George Hookham
by Malcolm W. Pierce
attorney

UnitedStatesPatentOffice 2,918,942
Patented Dec. 29, 1959

2,918,942
GOGGLE VALVE

George Hookham, London, England

Application December 20, 1954, Serial No. 476,513

1 Claim. (Cl. 138—94.5)

The present invention relates to an improved goggle valve of the kind commonly used for controlling the flow of fluid through conduits of relatively large diameter.

It is common practice at the present time, in order to control the flow of fluid through a conduit, to make a gap in the conduit and insert in it a valve comprising two fixed longitudinally spaced pipes between which are located an expansion bellows, a movable pressure ring and a goggle plate, valve seats being formed on the pressure ring and on one of the pipes, between which seats the goggle plate is nipped. Springs are used to hold the valve seats normally against the goggle plate and hydraulic rams to release the plate from the seats when it is desired to open or close the valve.

It is an object of this invention to provide mechanism for opening and closing the valve which lies wholly to one side of the goggle plate and which can be easily removed from the conduits, for repair or replacement, without placing the valve out of operation.

A preferred form of the invention will now be described with reference to the accompanying diagrammatic drawing, in which.

Figure 1:
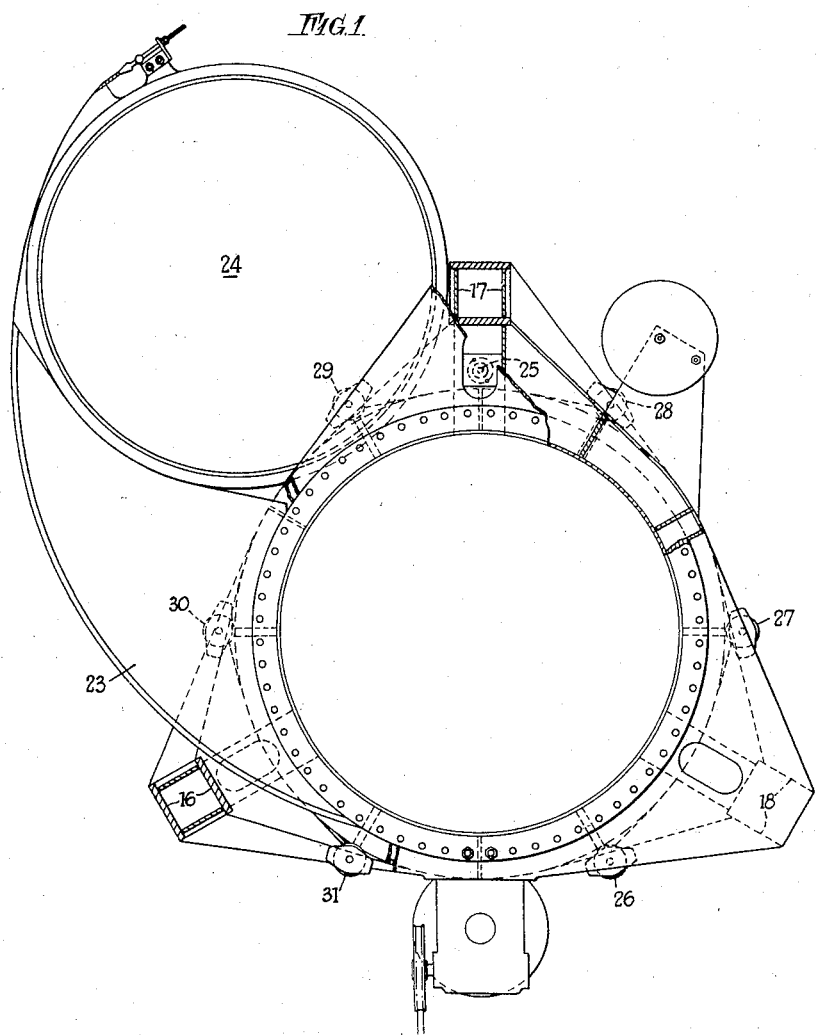
Figure 1 is an end view of a valve.

A gap is made in the conduit to be controlled leaving ends 10 and 11 between which the valve is sealably connected.

The valve comprises two short lengths of pipe 12 and 13 carried by a frame 14 and a support 15 respectively, both of which are roughly triangular in general shape. The frame and support are held rigidly at a fixed longitudinal distance apart by three tie members 16, 17 and 18 together forming a kind of spider. Bolted to the pipe 12 is an expansion bellows 19 which at its other end is bolted to a longitudinally movable pressure ring 20. Co-operating valve seats 21 and 22 are formed on the adjacent ends of the pressure ring 20 and pipe 13 and a goggle plate 23 is located between the seats.

The goggle plate is of conventional "spectacle" shape with an imperforate plate 24 in one "lens" position and a gap in the other. The full lines in Figure 1 show the valve in its fully open position. The plate pivots about point 25 but as the means for moving the plate transversely are conventional, they will not be described.

Figure 2:
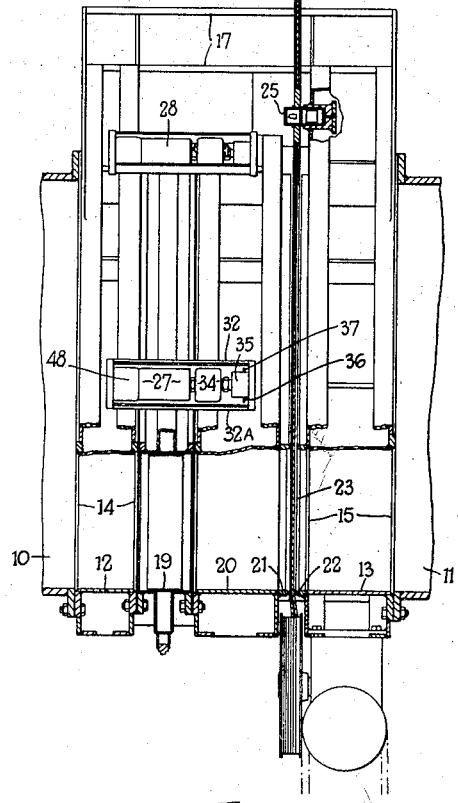
Figure 2 is a longitudinal view partly in section of the same valve.
Figure 3:
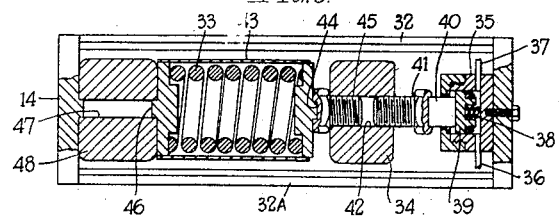
Figure 3 shows a detail of the apparatus of Figure 2.

Equi-angularly spaced around the pipe 12, and each secured to the frame 14, are six units each of which comprises plate clamping and releasing mechanisms 26, 27, 28, 29, 30 and 31. Since they are identical only the unit 27 (Figure 2) will be described. It is housed in a cage 32, 32A connected at its left-hand end to the frame 14. In the left-hand end of the cage is a powerful helical spring 33 in permanent compression between the frame 14 and a flange 34 on the pressure ring 20. In the right-hand end of the cage is a hydraulic ram which can be made to compress the spring 33 when so desired. The ram comprises a cylinder 35 with inlet and outlet 36, 37 respectively, a light spring 38, piston 39 and a rod 40, separate from the piston, having its left-hand end entering a recess formed in the head of a screw 41 working in a threaded bore 42 formed in the flange 34.

The spring 33 is housed in a box 43 inside the right-hand end of which is a spigot 44 fitting in a recess in the head of a screw 45, the shank of which also enters the threaded bore 42. The left-hand of the box 43 is formed with a spigot 46 entering a bore 47 in a member 48 rigid with the frame 14.

Normally pressure is released in the cylinder 35 and the spring 33 is operative to move the flange 34, and thus the pressure ring 20, to the right so that the goggle plate is clamped between the seat 21 on the movable pressure ring and the seat 22 on the fixed pipe 13.

In order to release the plate so that it may be moved transversely, fluid is admitted to the cylinder 35 under sufficient pressure to overcome the spring pressure and with adequate margin to enable it to separate the seats from the goggle plate. The piston 40 thus moves to the left, pushing the screw 41 ahead of it, so that the flange 34, and pressure ring 20 rigid with it, are also moved to the left to release the goggle plate.

Several advantages follow from the construction described. It will be appreciated that by screwing back the nut holding the spigot 44 so that the spring 33 is compressed and then locking the spring in the compressed position, then screwing the same nut into the flange 34, the spring and its box 43 can be removed transversely from the cage, the hydraulic ram being left in position.

Similarly, by screwing the nut 41 into the flange 34 until the piston 40 comes out of the recessed nut 41, then uncrewing the crew ant the right hand end of the ram, the latter can be removed transversely from the cage, the spring 33 meanwhile exerting its normal clamping action on the valve seats.

The pressure on the right-hand valve seat 22 is taken by the support 15 which is carried by the three ties 16, 17 and 18 and since these ties are further away from the axis of the valve than the mechanisms 26, 27, 28, etc., by which pressure is applied to the left-hand seat 21, the right-hand support 15 requires to be stiffer than the left-hand frame 14. For this reason the support is thicker, in the longitudinal sense, than the frame.

What I claim is:

In a goggle valve for controlling the flow of fluid through two longitudinally spaced conduits, which comprises two longitudinally spaced pipes for sealable connection to the conduits, a pressure ring between the pipes, an annular expansion bellows sealed at one end to one of the pipes and at its other end to the pressure ring, valve seats on the free end of the pressure ring and on the other pipe, a valve plate mounted for movement in a plane transverse to the axes of the pipes and a plurality of units each comprising a spring and a fluid-operated ram spaced angularly around the pipes wholly on the same side of the plate as the pressure ring for respectively clamping and unclamping the seats on the plate, the provision in each unit of a longitudinal cage having one end fixed to the said one pipe and the other end free but disposed on the same side of the plate as the pressure ring and a flange fixed to the pressure ring and extending transversely into the cage, a spring located in the cage so as to be in compression between one end of the cage and the flange and a ram located in the cage on the other side of the flange from the spring so that it can be expanded between the flange and the other end of the cage.

References Cited in the file of this patent
UNITED STATES PATENTS

| | | |
|---|---|---|
| 1,998,080 | Gerlich | Apr. 16, 1935 |
| 1,998,081 | Gerlich | Apr. 16, 1935 |
| 2,370,751 | Prager | Mar. 6, 1945 |
| 2,661,770 | Hookham | Dec. 8, 1953 |
| 2,661,771 | Hookham | Dec. 8, 1953 |

FOREIGN PATENTS

| | | |
|---|---|---|
| 826,098 | Germany | Nov. 22, 1951 |

UNITED STATES PATENT OFFICE
CERTIFICATE OF CORRECTION

Patent No. 2,918,942

December 29, 1959

George Hookham

It is hereby certified that error appears in the above numbered patent requiring correction and that the said Letters Patent should read as corrected below.

In the grant, lines 1, 2 and 3, for "George Hookham, of London, England," read -- George Hookham, of London, England, assignor to John Miles & Partners (London) Limited, of London, England, a British Company, --; line 12, for "Goerge Hookham, his heirs" read -- John Miles & Partners (London) Limited, its successors --; in the heading to the printed specification, line 3, for "George Hookham, London, England" read -- George Hookham, London, England, assignor to John Miles & Partners (London) Limited, London, England, a British Company --.

Signed and sealed this 14th day of June 1960.

(SEAL)
Attest:

KARL H. AXLINE
Attesting Officer

ROBERT C. WATSON
Commissioner of Patents